(12) United States Patent
Balashov et al.

(10) Patent No.: US 6,320,386 B1
(45) Date of Patent: Nov. 20, 2001

(54) METHOD OF PROSPECTING FOR GEOLOGICAL FORMATIONS AND APPARATUS FOR IMPLEMENTING THE METHOD

(75) Inventors: Boris Petrovich Balashov; Vladimir Sergeevich Mogilatov; Alexandr Kuzmich Zakharkin; Georgy Vasilievich Sachenko; Mikhail Jurievich Sekachev, all of Novosibirsk (RU)

(73) Assignee: Tovarischesivo S Ogranichennoi Oivetsivennostiju Nauchotekhnicheskaya Firma "Elta"-(RU)

( * ) Notice: Subject to any disclaimer, the term of this patent is extended or adjusted under 35 U.S.C. 154(b) by 0 days.

(21) Appl. No.: 09/584,040

(22) Filed: May 30, 2000

Related U.S. Application Data

(62) Division of application No. 09/012,587, filed on Jan. 23, 1998, now Pat. No. 6,114,855.

(51) Int. Cl.$^7$ ................................. G01L 3/02; G01L 3/04
(52) U.S. Cl. ............................................................. 324/357
(58) Field of Search ................................... 324/354, 357, 324/358, 360, 361, 362

(56) References Cited

U.S. PATENT DOCUMENTS 2,138,818 * 12/1938 Jakosky ................................. 324/357

* cited by examiner

Primary Examiner—Walter Snow
(74) Attorney, Agent, or Firm—Ostrolenk, Faber, Gerb & Soffen, LLP (57) ABSTRACT

When prospecting for geological formations, a feeding electrode 2 is grounded in the centre of a circle formed by uniformly grounded feeding electrodes 3. The feeding electrodes 3 are connected by lengths of supply lines 4 to current generators 1 via regulators 5. A first stage of investigations involves a preliminary sounding. Current pulses are applied from the generators 1 to the lengths of supply lines 4 which are connected to diametrically opposite feeding electrodes 3. A current pulse period is synchronized with a reference signal received by a receiver 7 from the global radio navigation system. Upon turning the current off, a signal of a field magnetic component transient is measured by a meter 8 that is coupled to a magnetic component sensor 9. Using the measurement results, a geoelectric section of country medium is constructed, and expected values of the field electric and magnetic components are determined for the case when the constructed geoelectric section incorporates a geoelectric model of the geologic formation being sought. A basic sounding of the studied medium is then performed by applying equal currents to the supply line lengths 4 and measuring signals of electric and magnetic component transients along the profiles radiating from the centre of said circle. The calculated and measured values of the field electric and magnetic components are compared and a decision on a presence of a geological formation in the studied medium is made based on the results of the comparison.

13 Claims, 6 Drawing Sheets

METHOD OF PROSPECTING FOR GEOLOGICAL FORMATIONS AND APPARATUS FOR IMPLEMENTING THE METHOD

This is a division of application Ser. No. 09/012,587, filed Jan. 23, 1998, now U.S. Pat. No. 6,114,655.

FIELD OF THE INVENTION

The present invention relates to methods of geological exploration employing electromagnetic field transients and may be used to prospect for local geological formations, particularly, on the world ocean shelf.

SU Inventor's Certificate No.1062631 discloses a method of geological exploration comprising the steps of exciting electromagnetic field in the studied medium by axially symmetrical injection of electric current to the Earth, using a circular electric dipole formed of feeding electrodes, wherein one of the electrodes is grounded in the center of a circle formed by the other uniformly grounded feeding electrodes, measuring parameters of a field electric component transient along profiles radiating from the circle center, and assessing, based on the measurement results, the structure and properties of the studied medium.

However, it is difficult to recover local nonuniformities by the above method as a signal of a transient in the electromagnetic field produced by influence of the country medium influence can be completely compensated only at the ideal axial symmetry of the current injection to the Earth, i.e. when the number of feeding electrodes grounded in a circle is infinitely large.

Mogilatov V.S., Balashov B. P., Sounding by Vertical Currents.—Physics of the Earth, 1944, pp.73–79, teaches a method of geological exploration using a circular electric dipole, comprising the steps of exciting an electromagnetic field in the studied medium by series of sounding current pulses generated by injecting electric current to the Earth by feeding electrodes, one of the feeding electrodes being located in the centre of a circle formed by the other feeding electrodes. The parameters of a field electrical component transient are measured along profiles radiating from the circle centre and the measurement results are used for assessing a structure of the medium being studied. The parameters of a field magnetic component are measured and the results are used to decide on presence or absence of a local formation. However, the above prior art method does not allow a decision to be made on which particular geological formation (karsts, kimberlite bodies, etc.) caused the horizontal nonuniformity of the section, detected by the measurements. Using this method, a preliminary construction of a geoelectric section of a country medium is impossible as the method is directed at obtaining an abnormal signal and, hence, the investigations are not highly informative.

An apparatus for implementing the aforementioned method comprises a current generator having a first output coupled to a feeding electrode which is located in the centre of a circle formed by the other feeding electrodes which are coupled to a second output of the current generator by respective supply line radial lengths. Each of the supply line radial lengths includes a current controller. The starting time of magnetic and electric component meters is synchronized with the time of turning the current on, using quartz-crystal clocks in the current generator and in the meters.

A problem with the prior art apparatus above is that when a number of radial lengths or a current in the radial lengths is increased, a higher current pulse amplitude is required in the current generator as the current pulse amplitude of the latter is a sum of current amplitudes in the radial lengths and, accordingly, a generator having a higher output power is required, making operation of the apparatus less reliable. Second, the prior art apparatus does not provide regulation of the current pulse amplitude in the radial lengths, which results in violation of axial symmetry in the current injection to the Earth and, hence, an increased background of uncompensated normal magnetic field. Third, to prospect for geological formations laying at small depths, i.e. when a field magnetic component is measured at the early stage of a transient, a highly accurate quartz synchronization is required between the current generator and the measurements of electric and magnetic components, which is hardly feasible in field conditions.

SU patent No.1819354 discloses a method of marine electrical exploration which is applicable in search and exploration for mineral deposits on water areas and involves exciting alternating electric field by a horizontal electric dipole and selecting optimum sounding spacing, taking into account variations in the sea bottom structure and in water layer thickness when conducting electric exploration operations from a moving ship. However, the method is only suitable for studying a sedimentary mantle of a small thickness (up to 50 m) at small depths (up to 30 m), and, in principle, is not capable of detecting elongated local formations such as formations of a "deposit" type, at large depths, insofar as with increase in a sounding spacing, a response signal is more and more effected by longitudinal conductivity of seawater.

The aforementioned method of sounding by vertical currents (J. Physics of the Earth, 1994, No.6, pp. 73–79) can be employed in the marine geological exploration. However, the employment of this method in the marine geologic exploration suffers certain problems. First, the measurement results will be essentially influenced by a seawater layer above the shelf surface, and this layer can be up to 300 m. Second, salinity of the seawater complicates the axially symmetrical injection of current to the Earth.

SUMMARY OF THE INVENTION

It is an object of the present invention to provide a method of prospecting for geological formations, wherein a magnetic component transient signal of a field produced by the country medium, is sufficiently compensated, using a practicable number of feeding electrodes grounded in a circle.

It is another object of the invention to provide a method and apparatus for prospecting for geological formations, which ensure higher information content of investigations, reduced background of uncompensated normal magnetic field and extend the range of studied depths towards both small and high values.

Additionally, it is an object of the invention to provide a method and apparatus for prospecting for geological formations on the world ocean shelf, using a circular electrical dipole.

In accordance with the invention the above objects are attained by a method of prospecting for geological formations, comprising the steps of using grounded feeding electrodes including a set of first feeding electrodes and at least one second feeding electrode to inject electric current to a studied medium and excite a signal of electromagnetic field transient in the studied medium;

locating said first feeding electrodes at equal distances in a circle at a site on the studied medium;

locating said at least one second feeding electrode in the centre of said circle;

more precisely defining a number of the first feeding electrodes such that a predetermined signal of a magnetic component transient of a field produced by the country medium does not exceed a predetermined level;

axially symmetrically injecting electric current to the studied medium by periodically coupling the electric current to said optimum number of the first feeding electrodes and to said second feeding electrode;

area measuring a signal of the electromagnetic field transient caused by the studied medium, upon each turning the electric current off at said first feeding electrodes and said second feeding electrode;

determining a time of maximum manifestation of a magnetic component transient signal of a field produced by the studied medium;

mapping, based on the results of area measuring the magnetic component transient signal, isolines corresponding to the time of maximum manifestation of the magnetic component transient, to decide on presence or absence of a geological formation on the studied medium.

The employment of grounded feeding electrodes arranged in a circle in accordance with the invention, wherein the number of the electrodes is defined so that a magnetic component signal of a normal field, i.e. the field produced by the country medium effect, does not exceed a predetermined level, ensures a compensation for the country medium influence, that is required to recover local nonuniformities. At the step of more precisely defining a number of the first feeding electrodes, a predetermined level is preferably an electromagnetic interference level or a level that is higher than the electromagnetic interference level, but less that a half of a maximum value of a magnetic component transient signal of a field produced by studied medium, wherein, in the latter case, said step of area measuring an electromagnetic field transient signal includes subtracting of measured values of a signal of a transient caused by the country medium from the results of measuring a signal of a transient caused by the studied medium.

Furthermore, said step of area measuring of a signal of the electromagnetic field transient preferably includes taking measurements either along radial profiles running through grounding points of said first feeding electrodes and/or through a centre of a distance between any two adjacent electrodes of said set of first feeding electrodes, or along mutually perpendicular profiles forming a grid, or along randomly arranged profiles.

At said step of mapping isolines, values of a vertical magnetic component transient of the field produced by the studied medium are preferably used.

Preferably, a method further includes a step of changing a radius of a circle in which said first feeding electrodes are arranged not less than twice, from measurement to measurement.

The above embodiments of the method according to the invention improve information content of the obtained data, enhance compensation for the country medium effect and make the investigations more uniform.

The aforementioned objects are further met by providing a method of prospecting for geological formations comprising the steps of using grounded feeding electrodes including a set of first feeding electrodes and at least one second feeding electrode to inject electric current to a studied medium and excite a signal of electromagnetic field transient in the studied medium;

locating said first feeding electrodes at equal distances in a circle at a site on the studied medium;

locating said at least one second feeding electrode in the centre of said circle;

preliminarily sounding the studied medium, including injecting electric current to the studied medium by periodically coupling the electric current to a pair of diametrically opposite electrodes of said set of first feeding electrodes and area measuring a signal of a transient of the electromagnetic field produced by the studied medium, said measuring being conducted after turning the electric current off at said pair of first feeding electrodes;

constructing, based on the measurement results of the preliminary sounding, a geoelectric section of the country medium and calculating expected values of signals of electric and magnetic component transients for the case when the constructed geoelectric section incorporates a geoelectric model of the geological formation being sought, the parameters of the geologic model being varied within a predetermined range;

basically sounding the studied medium, including axially symmetrically injecting electric current to the studied medium by periodically coupling the electric current to said first feeding electrodes and said at least one second feeding electrode and area measuring signals of electric and magnetic component transients of the field produced by the studied medium, said area measuring being performed after each turning the electric current off at said first feeding electrodes and said second feeding electrode, along profiles radiating from the centre of said circle;

comparing the measured values of the signals of electric and magnetic component transients, obtained at said step of basically sounding, to the calculated expected values of said signals; and making a decision on a presence of the sought geological formation in the studied medium, based on the comparison results.

The construction of a geoelectric section of the country medium provides an opportunity to define, based on the preliminary sounding results, values of expected transient signals for those cases when the produced geoelectric section incorporates a geoelectric model of the formation being sought, the parameters of the model being varied within a predetermined range, which allows the values of the expected transient signals to be compared with the results of the basic sounding and thereby the information content of the studies to be extended, and also permits the parameters of the sounding installation (beam length, number of beams and beam current) and the explored area to be exactly defined, which results in improved efficiency of exploration and saved power.

The step of preliminary sounding preferably includes measuring signals of the field magnetic component transient along profiles that are perpendicular to a line connecting said pair of diametrically opposite feeding electrodes, and the step of comparing includes comparing the measured and expected values of the signals on times of maximum manifestation of the magnetic component transient signal.

Additionally, a method preferably includes a step of synchronizing a time of coupling electric current to said feeding electrodes and time of starting the measurements of transient signals with a reference time and frequency signal received from the global radio navigation system, and a step of comparing a present amplitude value of the electric current applied to each of said first feeding electrodes with a predetermined value, and when they do not coincide, varying the present current amplitude value until said predetermined value is reached.

The measurements taken after turning off the electric current injected to the Earth through a pair of diametrically opposite electrodes along the profiles which are perpendicular to a line connecting said feeding electrodes, enhance reliability of the information on the geoelectric section of the country medium.

Synchronization of a time of coupling electric current to said feeding electrodes and time of starting measurements of the transient, using a highly accurate time scale of the global navigation system provides a possibility to carry out measurements at early stages of the transient and thereby to begin the search for geological formations from the daylight area.

Comparison of a present pulse amplitude value of the current applied to each of the feeding electrodes arranged in a circle with a predetermined value and, when they do not coincide, variation of this value until the predetermined value is reached, makes it possible to avoid violation of axial symmetry when injecting the current to the Earth, and, therefore, to reduce a background of uncompensated normal magnetic field.

According to the invention, the above objects are attained by provision of an apparatus for prospecting for geological formations, including a power source;

a set of first feeding electrodes to be located in a circle at equal distances at a site on the studied medium;

at least one second feeding electrode to be located in the centre of said circle, said second feeding electrode being coupled to one of poles of said power source;

a plurality of current generators, each having a first output, a second output and a clock input, wherein said first outputs of the current generators are joined together and coupled to the other pole of said power source;

a plurality of supply line radial lengths arranged along radii of said circle, each of said supply line radial lengths being coupled by one end to the second output of the respective current generator, and by the other end to a respective feeding electrode of said set of first feeding electrodes;

a plurality of field electric component meters, each having an input connected to a respective field electric component sensor, and an output connected to a respective unit for processing measurement results;

a plurality of field magnetic component meters, each having an input connected to a respective field magnetic component sensor, and an output connected to a respective unit for processing measurement results;

a plurality of the global navigation system receivers, each having a first output and a second output, wherein the first output of a first global radio navigation system receiver is coupled to interconnected clock inputs of said current generators, and the first output of the remaining global navigation system receivers is coupled to a respective electrical and magnetic component meter, while the second outputs of said global navigation system receivers are coupled to respective units for processing measurement results.

The apparatus above preferably comprises a plurality of current controllers, preferably formed as a controlled current regulator, each of which is included in a respective supply line radial length between a second output of a respective current generator and a respective feeding electrode of said set of first feeding electrodes, and has a control input and control output; and a multichannel control and current regulation unit having a plurality of inputs coupled respectively to the control outputs of the current controllers included in the supply line radial lengths, and a plurality of outputs coupled respectively to the control inputs of current controllers According to the invention the objects above are also attained by a method of prospecting for geological formations on the word ocean shelf, comprising the steps of using a plurality of grounded feeding electrodes, including a set of first feeding electrodes and at least one second feeding electrode to inject electric current to a studied medium and excite a signal of electromagnetic field transient in the studied medium;

locating said first feeding electrodes at equal distances in a circle having a radius R, at a site on the studied medium;

locating said at least one second feeding electrode in the said circle;

sounding the studied medium, including axially symmetrically injecting electric current to the studied medium by periodically coupling the electric current to said first feeding electrodes and said second feeding electrode, area measuring a magnetic component transient signal of a field produced by the studied medium, the measurement being taken upon each turning the electric current off along profiles radiating from the centre of said circle, and area measuring an field electric component transient signal upon each turning the electric current off, when the measured values of the field magnetic component transient signal are present;

mapping, based on the measurement results, isolines to define a position and boundaries of the detected geological formation in the studied medium.

The radius R of said circle is preferably at least ¼ of a predetermined depth of investigations, and the step of sounding the studied medium preferably includes measuring of the field magnetic and electric components on the area defined by a circle having a radius 5R, along profiles radiating from said second feeding electrode.

Additionally, when sounding a site on the sea shelf, the method preferably includes a step of setting a maximum operating current applied to each of said first feeding electrodes, said step including varying a contact surface area of the first feeding electrodes and seawater until the maximum operating current value is attained.

In this embodiment, selection of the installation radius with account of the studied depth and the depth to the sea bottom makes it possible to extend the field of a circular electric dipole employment and to use it in geophysical investigations on the world ocean shelf, and variation of a contact surface area of the feeding electrodes and seawater permits an optimum operation current to be set in the supply lines when values of seawater salinity (mineralization) change, thereby saving energy. The measurement of the field electric component only when abnormal magnetic component values are present makes it possible to separate search and exploration stages in detection of local formations, and avoid excessive measurements, as the presence of the field magnetic component unambiguously indicates the presence of a local formation. The absence of the magnetic component indicates that there is no local formation, and, therefore, the measurements of the field electric component and, accordingly, the subsequent interpretation and analysis of the section, are not required. Furthermore, the efficiency of exploration operations is improved owing to time and costs saved. Taking measurements on the area defined by a circle having a radius that does not exceed 5R allows the energy consumption in the geophysical studies to be reduced.

The objects of the invention are met by provision of an apparatus for prospecting for geological formations on the world ocean shelf in open sea, comprising a plurality of feeding electrodes, including a set of first feeding electrodes and at least one second feeding electrode;

a plurality of buoys installed on sea surface to locate said first feeding electrodes at equal distances in a circle and to locate said at least one second feeding electrode in the centre of said circle, respectively;

a current generator having a first output coupled through supply lines to said first electrodes and a second output coupled to said second electrode;

at least one field magnetic component meter having an input connected to a field magnetic component sensor, and an output connected to a unit for processing measured data;

at least one field electric component meter having an input connected to a field electric component sensor, and an output connected to a unit for processing measured data.

The lengths of supply lines are preferably disposed along radii of said circle through equal predetermined angles that do not exceed 60°, and each of the supply lines includes a current controller.

Additionally, each of the supply lines is advantageously disposed inside the respective lengths of the cable ropes which mechanically connect the buoy on which said second feeding electrode is located, with the buoys on which said first feeding electrodes are located, each of the buoys on which the first electrode is located being mechanically connected to a pair of adjacent buoys by equal lengths of a nonconductive rope.

Each buoy on which the first feeding electrode is located preferably comprises an electric motor coupled to a power source and connected through a shaft with a driving propeller, the power source being common for all of the buoy electric motors and is connected to each of said electric motors by a pair of leads disposed in the respective cable rope lengths.

The above embodiment of the apparatus according to the invention provides the axially symmetric geometry of the assembly when it is located in open sea, and retains the assembly in a set point of geophysical investigations due to tensioning of radial and peripheral rope lengths during operation of driving propellers.

BRIEF DESCRIPTION OF THE DRAWINGS

The invention will become more apparent from the following detailed description of its embodiments taken in conjunction with the accompanying drawings wherein the same reference numerals are used for similar elements.

DETAILED DESCRIPTION OF PREFERRED EMBODIMENTS

An apparatus for prospecting for geological formations (FIGS. 1, 5) includes a power source U, current generators 1, a feeding electrode 2 located in the centre of a circle formed by feeding electrodes 3, supply line radial lengths 4 disposed along radii of the circle through equal angles that do not exceed 60°. The feeding electrodes 2, 3 form a circular electric dipole. One ends of the radial lengths 4 are coupled to respective feeding electrodes 3, while the other ends are joined together and coupled to one of poles of the power source U. The second pole of the power source is coupled to the feeding electrode 2. Each of the radial lengths 4 of the supply line includes, in succession, a controlled current regulator 5 and a current generator 1. A measuring output of each controlled current regulator 5 is connected to a control input thereof through a current measuring and controlling unit 6. A clock input of the unit 6 is joined with clock inputs of the current generators 1 and connected to a first output of one of the reference time and frequency signal receivers 7 of the global navigation system (GNS). First outputs of the other receivers 7 are coupled to clock inputs of respective meters 8 that are coupled to magnetic component sensors 9 and electric component sensors 10, respectively. Second outputs of the receivers 7 are connected to appropriate inputs in portable computers 11 each of which is connected to a respective meter 8.

The controlled current regulator 5 (FIG. 2) comprises a current regulator 12. A control input of the regulator 12 is connected via a digital-to-analog converter (DAC) 13 and a buffer register 14 to a register 15. A clock input of the register 15 is connected to an output of a quartz-controlled oscillator 16. A control input of the controlled current regulator 5 is an input of the register 15, which is connected to a corresponding output of the current measuring and controlling unit 6.

Figure 2:
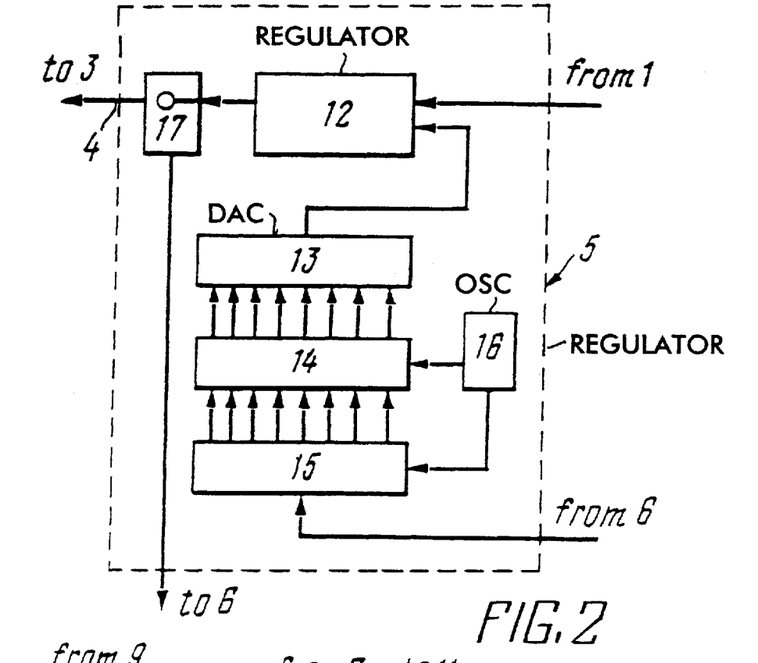
FIG. 2 is a block diagram of a controlled current regulator.

An input of the controlled current regulator 5 is an output of the current controller 12 which is coupled to an output of the generator 1, while an output of the current regulator 5 is an output of the current regulator 12, coupled to the radial length 4. A measuring output of the regulator 5 is an output of a sensor 17 through which a radial length 4, coupled to an output of the current regulator 12, runs.

The current measuring and controlling unit 6 (FIG. 3) comprises a control panel 18, a processor 19, a current meter 20 and a current controller 21, all interconnected by a common bus 22. The current meter 20 includes an analog switch 23 coupled to an analog-to-digital converter (ADC) 24 and a data register 25 connected to the common bus 22 and to an output of an address selector 26 which is connected to the common bus 22. Control inputs of the switch 23 and ADC 24 are coupled via a digital switch 27 to a shift register 28. A quartz-controlled oscillator 29 and a trigger 30 are connected to an input of the register 28 via an AND-NOT circuit 31. An input of the trigger 30 is a clock input of the unit 6 and an input of the meter 20. Inputs of the switch 23 are measuring inputs of the unit 6 and, respectively, inputs of the meter 20.

Figure 3:
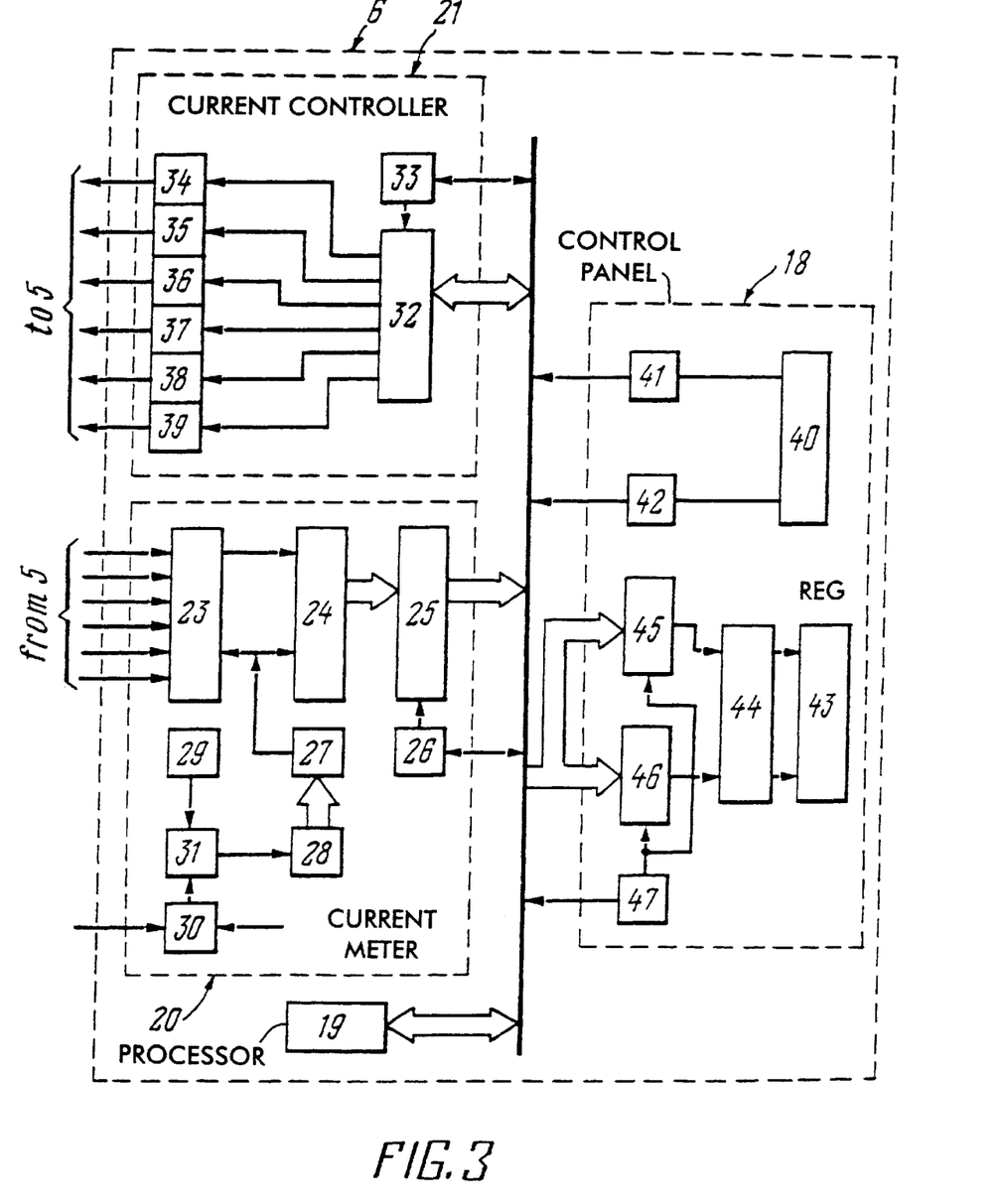
FIG. 3 is a block diagram of a unit for measuring and controlling current.

The current controller 21 comprises a data register 32 coupled to the common bus 22 both directly and through an address selector 33. Inputs of the data register 32 are coupled to buffer shapers 34 to 39. Outputs of the buffer shapers 34 to 39 are the outputs of the regulator 21 and, concurrently, the outputs of the current measuring and controlling- unit 6, each being respectively connected to the control inputs of the regulator 5.

The control panel 19 includes a keyboard 40 which is connected to the common bus via code converters 41, 42, an indicator 43 connected to the common bus via a control circuit 44 and data registers 45, 46 whose address inputs are connected to the common bus 22 through the address selector 47.

Figure 4:
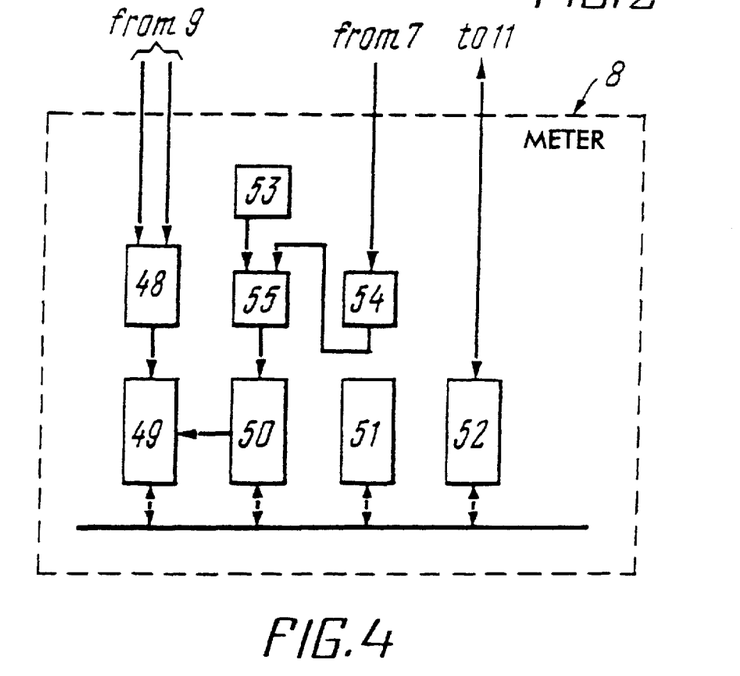
FIG. 4 is a block diagram of a meter.

Magnetic and electric component meters 8 have identical design, the only difference being in a value of an input resistance, which is higher for the meter that is coupled to a sensor 10, representing a receiving line MN. Each of the meters 8 includes a preamplifier 48 coupled in series to the ADC 49, an enabling input of the ADC being connected to a time unit 50 which is coupled via a trunk with the ADC 49, a processor 51 and a transceiver 52. A quartz-controlled oscillator 53 and trigger 54 are coupled to an input of the time unit 50 via an AND-NOT circuit 55. Inputs of the preamplifier 48 are measuring inputs of the meter 8, an input of the trigger 54 is a clock input of the meter 8, and input and output of the transceiver 52 are an information input and output of the meter 8.

A direct search for geological formations is accomplished as follows.

Figure 5:
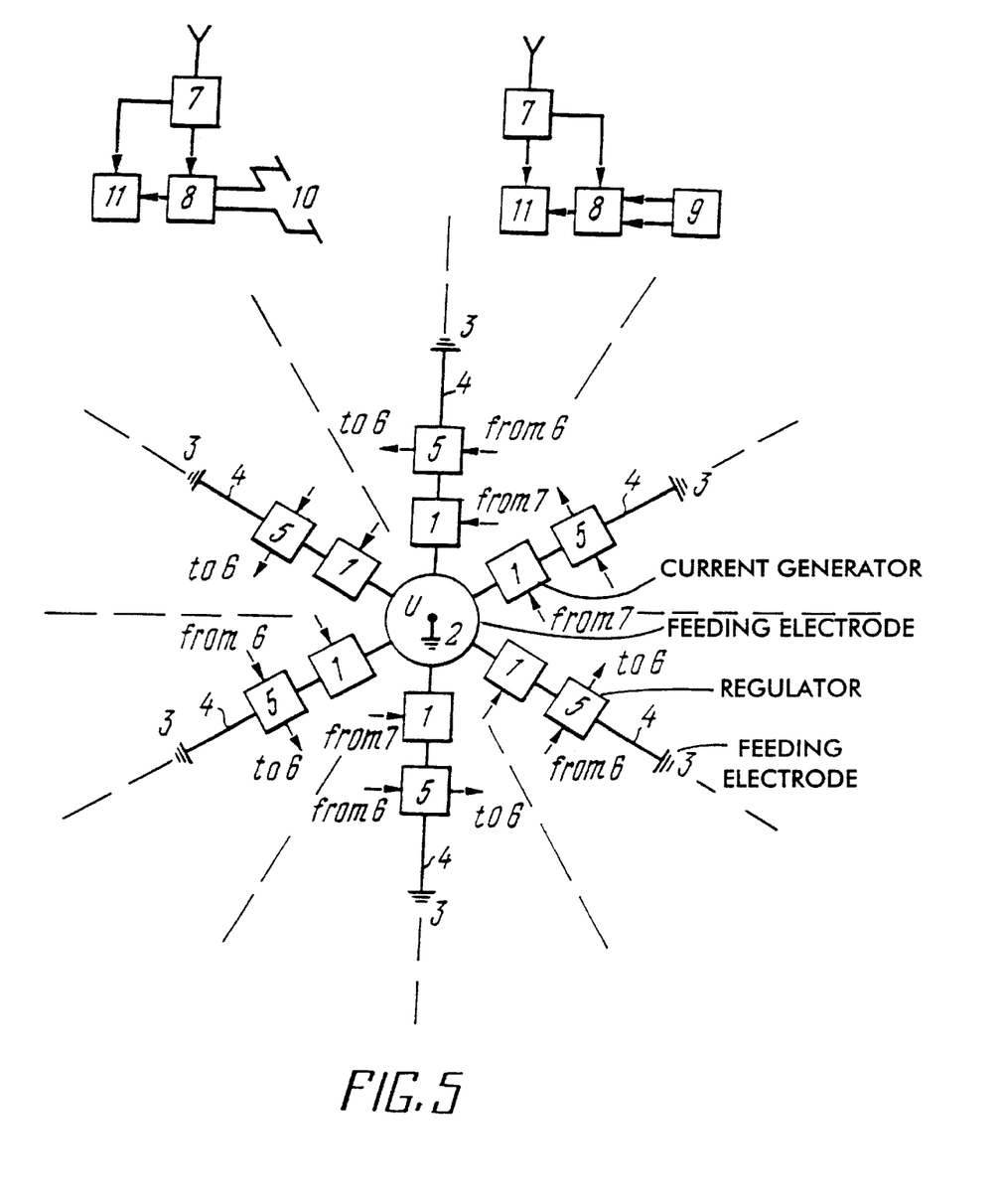
FIG. 5 illustrates schematically how the apparatus of FIG. 1 is arranged at a site.

Dimensions and a number of radial lengths 4 of a circular electric dipole and amplitude of current pulses generated by current generators 1, depending on the depth investigated, are determined based on a particular geophysical problem to be solved. The apparatus is installed at a site as shown in FIG. 5. A feeding electrode 2 is grounded in the centre of a circle formed by uniformly grounded feeding electrodes 3. The feeding electrodes 3, a number of which should be not less than 6, are connected to outputs of the current generators 1 via regulators 5 by radial lengths 4 arranged along the circle radii through equal angles that do not exceed 60°. The other outputs of the generators 1 are joined together and coupled to one of poles of a power source U. The other pole of the power source U is connected to the feeding electrode 2. Sensors 9, 10 are disposed outside the circle formed by the electrodes 3, along profiles plotted on the extensions of radii radiating from the circle centre, and coupled to appropriate meters 8 to measure field magnetic and electric components.

At the first stage of investigations, a preliminary sounding is carried out. For this purpose, currents of equal magnitude are provided to a pair of radial lengths 4 coupled to diametrically opposite feeding electrodes 3 and forming a line AB, by respective current generators 1. The current magnitudes are monitored by the unit 6 and balanced by controlled current regulators 5. A period of the current pulses from the current generators 1 is synchronized with a reference signal received from the GNS receiver 7. Once the current is turned off, a field magnetic component transient signal H(t) is measured by the meter 8 coupled to the sensor 9, the measurements being taken along the profiles that are perpendicular to the line AB. Based on the results of measurements of the signal H(t), a geoelectric section of the country medium is constructed using a conventional technique.

Then, using mathematical simulation, expected values of transient signals H(t) of the electromagnetic field produced by the circular electric dipole are determined for the case when the constructed geoelectric section comprises a geoelectric model of the geological formation being sought, its parameters, such as conductivity, shape, dimensions, laying depth, distance from the circular electric dipole centre, being varied within a predetermined range.

A basic sounding is then accomplished by applying equal currents to the radial lengths 4 and measuring values of the signal H(t) along profiles located on the extensions of radii of the circular electric dipole. A presence of a magnetic component transient signal H(t) indicates that a geological formation is present. To define the contours of the formation, more detailed measurements are performed, and a pattern of a field above the formation is plotted on the time of maximum manifestation of the magnetic component transient signal of a field produced by the geological formation.

The parameters of the geological formation are defined by comparing the obtained experimental data and the mathematical simulation data. When doing this, a more detailed mathematical simulation is performed to attain quantitative and qualitative agreement between the experimental and calculated data.

Figure 1:
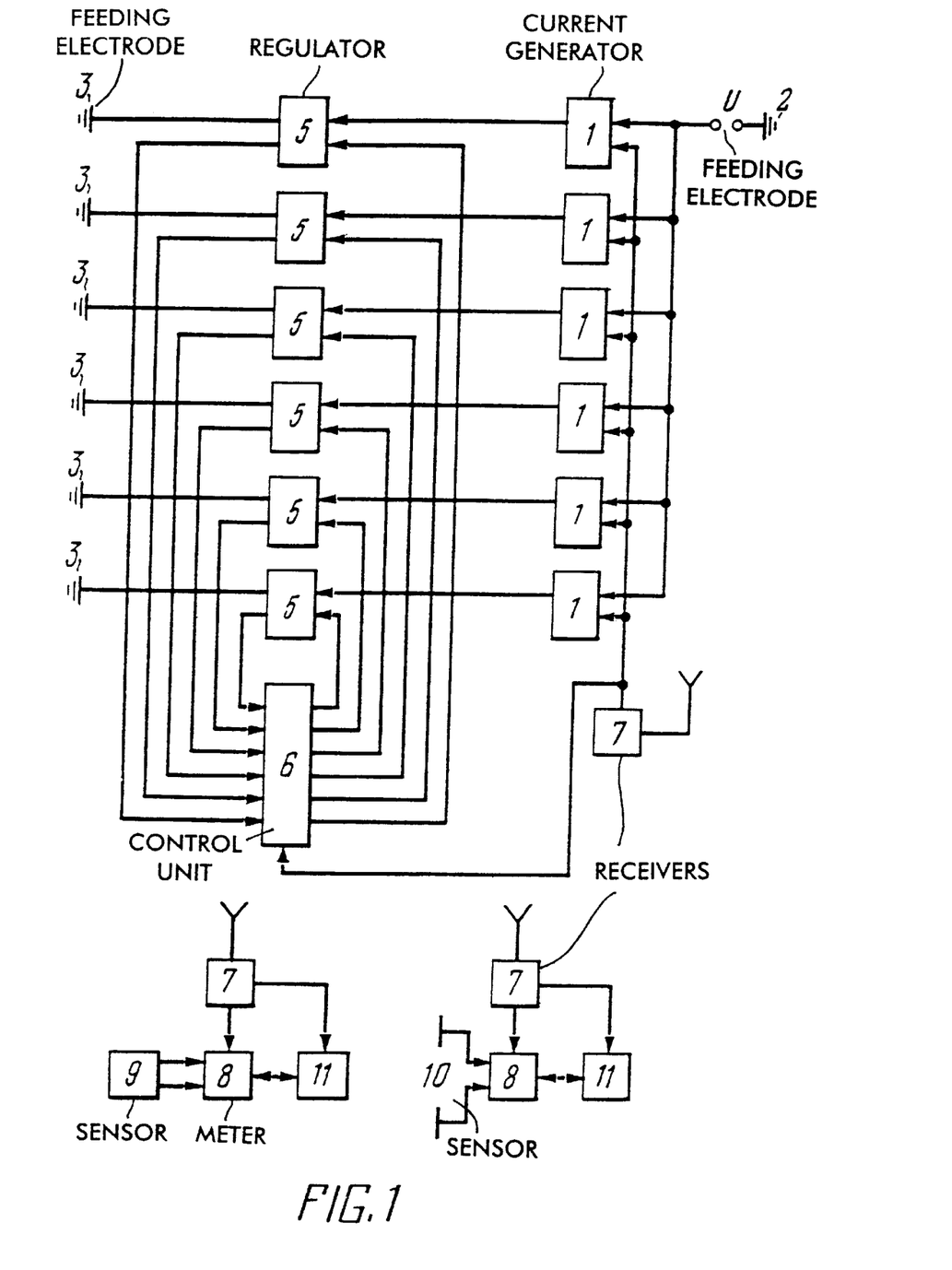
FIG. 1 is a block diagram of an apparatus for prospecting for geological formations.

The operation of an apparatus for implementing the method according to the invention is coordinated by control software stored in ROM in the processor 19 of the unit 6 and in ROM in the processors 51 of the meters 8.

When power is turned on, a reference time and frequency signal, represented as a sequence of pulses having a period of 1c and duration of 1 $\mu$c, is provided to clock inputs of current generators 1, unit 6 and meters 8 from outputs "1c" of the GNS receivers 7. The clock pulse activates the current generators 1 and a current pulse is provided to the radial lengths 4.

The processor 19 of the unit 6 starts implementing the Current Control program. To this end, an operator enters a value of a current pulse amplitude in the radial lengths 4 from a keyboard 40 on the control panel 18 of the control unit 6. The entered value of the current pulse amplitude is transmitted, by instruction of the processor 19, through code converters 41, 42 and a common bus 22 via data registers 43, 46, control circuit 44, and is displayed on an indicator 43, while control codes are provided through data register 32 and buffer shapers 34 to 39 to control inputs of the controlled current regulators 5. An address selector 33 in the controller 21 of the unit 6 alternately sets addresses of the regulators 5, a sequential code of the entered current amplitude value is coupled to an input of the register 15 in the regulator 5, a clock input of which is coupled to the quartz-controlled oscillator 16. The sequential code is converted to a parallel code and provided through the buffer register 14 to inputs of the DAC 13 which generates a control voltage equivalent to the input code. By the action of the control voltage, the current regulator 12 maintains the entered current pulse amplitude value in a radial length 4. Current in the radial lengths 4 induces a voltage proportional to the current in Hall-effect sensors 17 and is provided to an input of a multichannel current meter 20 in the unit 6. Concurrently with turning on current in the generators 1, a synchronization pulse from the output "1c" in the GNS receiver 7 is provided to an input of the trigger 30 which input is a clock input of the unit 6. When the Start key is pressed, a pulse arrives at an input SET of the trigger 30 and enables clock pulses from the generator 29 to pass through a AND-NOT circuit 31 to an input of a shift register 28 which alternatively couples, through a digital switch 27, inputs of an analog switch 23 to the ADC 24. From ADC 24 output, current value codes for each radial length 4 are alternately stored in the data register 25. The address selector 26 assigns appropriate addresses to the measured current values, and current codes are provided to the common bus 22. The processor 19 compares, in turn, the code of the current value entered from the keyboard of the control panel 18 with the codes of the measured current values in the radial lengths 4.

When the codes match, the control voltage at the output of the DAC 13 in the unit 6 is unchanged, otherwise the control voltage varies in accordance with the comparison result in the current measuring and controlling unit 6. During one period of synchronization pulses, having a duration of "1c", the currents are measured in all radial lengths 4 and control codes are outputted for all of the regulators 5. Therefore, present values of pulse amplitudes are regulated in the radial lengths 4.

A reference time and frequency signal from the GNS concurrently arrives at inputs of all receivers 7, the outputs of which are connected to meters 8. From outputs of each of the receivers 7 the reference signal having a period 1c comes to an input of a trigger 54, which is a clock input of a meter 8. A measuring process in the meter 8 is enabled by pressing the Enter key on the control panel of the computer 11. The trigger 54 is then set to the initial state and, with arrival of a first synchronization pulse, enables clock pulses to pass from the quartz-controlled generator 53 via the AND-NOT circuit 55 to an input of the time unit 50 which, upon a time period equal to the duration of a current pulse, enables the operation of the ADC 49 in accordance with the transient measurement time scale which is programmed in the time unit 50 by the computer 11 immediately before starting the operation of the apparatus according to the invention. Signals from the magnetic component sensor 9 or electric component sensor 10 are coupled to inputs of the ADC 49 via a preamplifier 48. The processor 51 polls an output of the ADC 49 in accordance with the time scale and via a transceiver 52 sends the results to the computer 11. Once a prescribed number of measurement cycles has been repeated in the computer, the measurement process is terminated and the measurement results are stored on a magnetic carrier in a prescribed format, including a location of the point on the profile, which was determined using the GNS receiver 7 and transmitted vi-a an interface to the computer 11. The meters 8 and sensors 9, 10 are then moved along the profile at a predetermined distance and the process of measuring the field electric and magnetic components is repeated. Once the measurements have been taken for all the area studied, the measurement results are processed and a pattern of the magnetic component is plotted on the maximum manifestation time. The pattern plotted based on the results of the measured values is then compared with the pattern constructed for a geoelectric model of the sought formation by the image recognition technique. The comparison results are used to decide whether the sought formation is present.

In the described example, a period of current pulses is the same as the reference signal period. However, the period of current pulses may be a multiple of an integer n of the reference signal periods, or a multiple of 1/n.

Figure 6:
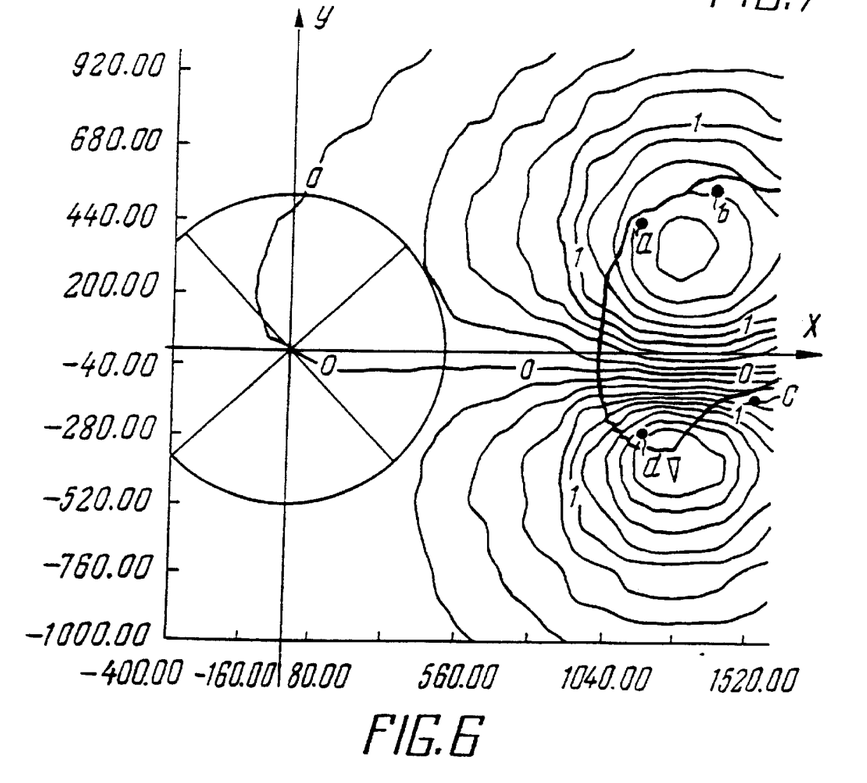
FIG. 6 shows plots of expected and observed signals of a transient.
Figure 7:
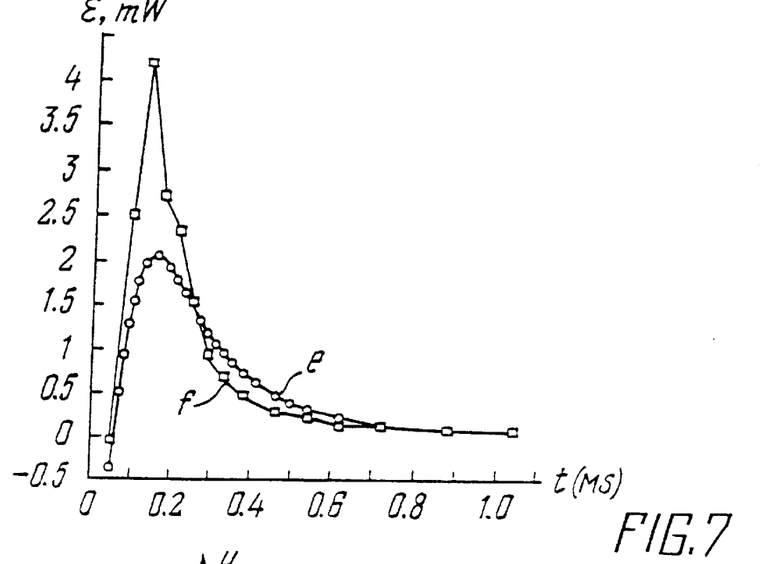
FIG. 7 is an example of an isoline map of the observed signal of a transient.

FIGS. 6, 7 illustrate simulation results and results of practical measurements. FIG. 6 shows schematically a circular electric dipole location and dimensions. Using the simulation results, there has been constructed a pattern of a field above the formation in plan (thin lines) and a contour of the ore body, passing through the points a, b, c, d, that show maximum measured signal values and correspond to the edge of the ore body. FIG. 7 shows plots of the expected values of a magnetic component signal (Plot e) and actual signal (Plot f). The plots demonstrate essential coincidence of the signals in time.

Figure 8:
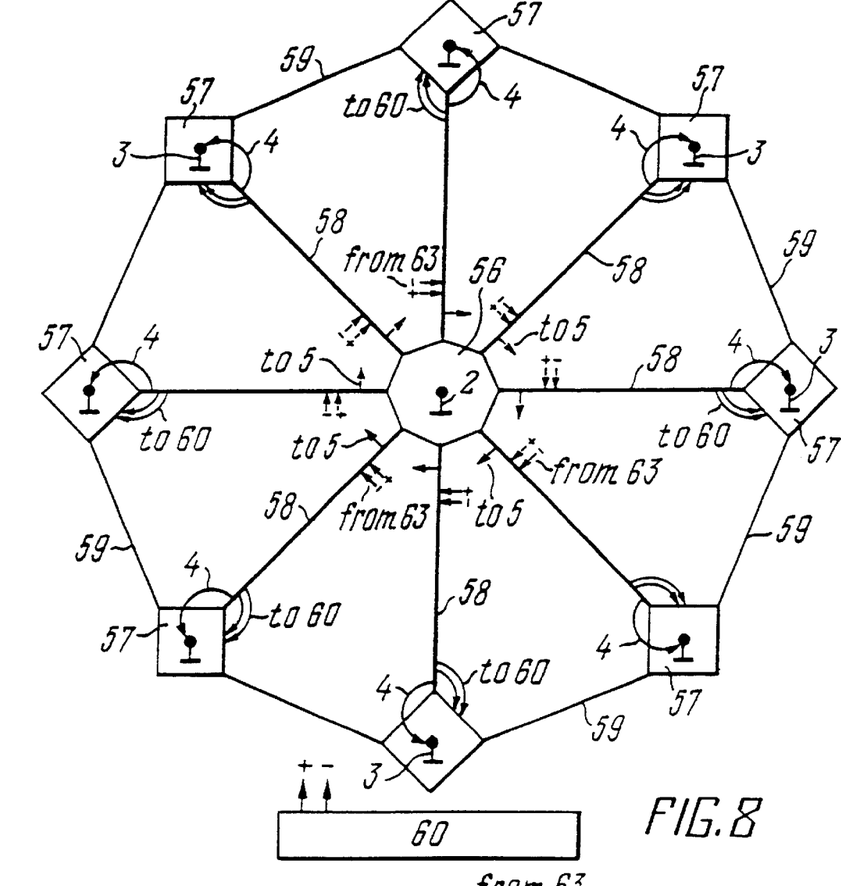
FIG. 8 shows schematically how the buoys, aligned with the feeding electrodes, are connected.
Figure 9:
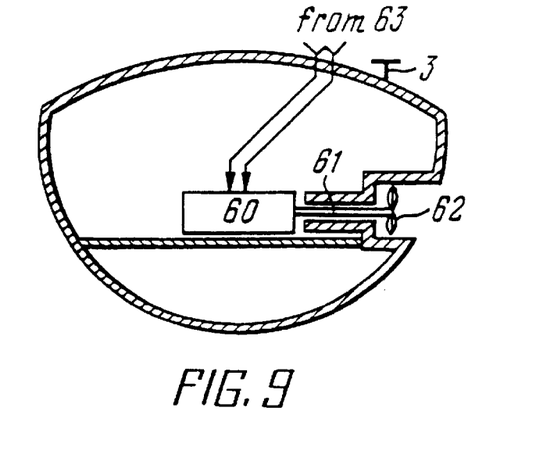
FIG. 9 is a cross-sectional schematic representation of a structure of one of the buoys used in an apparatus of FIG. 8.

Referring now to FIGS. 8, 9, there will be described a method of prospecting for geological formations on the world ocean shelf and an apparatus for implementing the method in accordance with the teachings of the present invention.

FIG. 8 shows schematically how a buoy 56 aligned with a central electrode 2 and buoys 57 aligned with external electrodes 3 are connected. Lengths 58 of insulated, e.g three-core cable rope, which have the same length as respective supply lines 4, connect the buoy 56 with buoys 57, and similar lengths 59 of nonconducting rope connect each of the buoys 57 to a pair of adjacent buoys 57.

Each of the buoys 57, which structure is shown in FIG. 9, includes an electric motor 60 which is coupled through a shaft 61 to a driving propeller 62. The electric motor 60 is, for instance, a dc motor. Supply terminals of the electric motor 60 are connected to appropriate poles of the power supply 63 which, in this case, is common for all electric motors 60 and implemented as a dc generator or an accumulator battery. Feeding electrodes 2, 3 may be made e.g. as terminals located on the housings of the buoys 56, 57, respectively.

In the shelf regions covered by polar ice, a method according to the invention is accomplished using an apparatus designed similarly to that shown in FIG. 1, which is disposed on the ice surface. Through a hole in ice, a central feeding electrode 2 is submersed in seawater in the centre of a circle formed by feeding electrodes uniformly grounded in seawater through holes in ice. A value of the circle radius R is selected to be not less that a quarter of the predetermined depth to be investigated. A contact surface area of each of electrodes 3 with seawater is determined depending on a maximum value of operating current $I_{max}$ in a supply line 4. To this end, before starting the operation, a resistance of a line 4 between the central electrode 2 and one of the external feeding electrodes 3 is measured using an ohmmeter 3. This resistance is a sum of equivalent resistance $R_{eq}$ of the current regulator 7 and seawater resistance $R_{sw}$, which is defined directly by a seawater resistance and a contact surface area of the electrode 3 with seawater. The output voltage U of the current generator 1 being known, a value of the current I flowing through the current regulator 7 is defined by formula:

$$I=U/R_{eq}+R_{sw}$$

When $I>I_{max}$, the contact surface area of electrodes with seawater is reduced, while at $I<I_{max}$ the contact surface area is increased, the measurements of resistance $R_{eq}$ are repeated, values of current I are calculated and compared with $I_{max}$. The variation of the contact surface area is continued until I value equals $I_{max}$. By doing this, a maximum value of the operating current flowing through the current controller 5 is attained to provide a uniform current control in all supply lines 4. It should be noted that a total current of the apparatus flows through the electrode 2, while the current flowing through the external electrodes 3 is n times less, where n is a number of supply lines 4. The number of feeding electrodes 2 should be not less than 6, and they should be uniformly disposed in a circle.

Current of prescribed amplitude and duration is applied by the current generator 1 to the supply lines 4. A magnitude of the current in each of the lines 4 is set by the current controller 5. After turning the current off, a field magnetic component H(t) is measured on the area defined by a circle whose radius does not exceed 5R, along radiating profiles. The field magnetic component may be measured from aircraft. In this case the meter 8 is disposed directly on the aircraft, and an inductive sensor 9 is disposed in a pod which is connected to the aircraft by a cable rope. When the measured field magnetic component values are present, which is indicative of the presence of a local formation, more detailed measurements are performed to define the contour of the formation, followed by measuring the field electric component. A meter 8 coupled to a sensor 10 is disposed at the area being investigated. Current of a prescribed amplitude and duration is provided to the supply lines. Upon turning the current off, the field electric component E(t) is measured along the profiles radiating from the centre of a circle formed by the installation. Based on the measurement results, a geoelectric section is constructed, from which a nature and properties of the medium are defined. In both cases of measuring the field components, the measured data are registered by a portable computer.

To operate in open sea, it is necessary not only to retain the circular electric dipole on the sea surface, but to keep its geometry exact. Otherwise, as mentioned above, with violation of the circular electric dipole geometry, a powerful normal magnetic field will arise. To implement the method in open sea, an apparatus illustrated in FIGS. 8, 9 is employed. The apparatus is arranged as follows. A buoy 56 aligned with a feeding electrode 2 and buoys 57 aligned with external feeding electrodes 3 are discharged from a geophysical ship to sea, and the buoys are connected in accordance with the scheme of FIG. 8 by lengths 58 of an insulated three-core cable rope and lengths 59 of a nonconductive rope. Supply terminals of each electric motor 60 are connected to a first and second cores of the appropriate length of the three-core cable rope, while the third core of the length 58, forming a supply line 4, is connected to a terminal which is disposed on a casing of the buoy 57 and acts as the feeding electrode 3. Free ends of the supply lines 4 are joined together and coupled to one of the poles of the current generator 1, the other pole of which is coupled to a terminal which is located on a casing of the buoy 56 and acts as a feeding electrode 2, and the free ends of first and second cores in the lengths 58 are joined to each other in parallel and coupled by a cable to appropriate poles of a power source 63 located on the ship. Power is supplied from the power source 63 to the electric motors 60 on the buoys 57. The electric motors 60 drive propellers 62 through shafts 61, and buoys 57 start to radially diverge as the external buoys 57 are joined therebetween by equal lengths 59 of the nonconducting rope and connected to the central buoy 56 by equal lengths of the cable rope 58. To reduce power consumption from the power source 63, floats can be attached to the cable rope lengths 58 and to the rope lengths 59. The moving force of the buoys 57 should exceed tension of the cable rope lengths 58 and the rope lengths 59. Within a certain time period, the buoys 57 will occupy their positions relative to the central buoy 56, as shown in FIG. 8. Current of a predetermined amplitude and duration is then applied to the lines 4 from the current generator 1. Upon turning the current off, the magnetic component H(t) is measured on the area defined by a circle having a radius which does not exceed 5R. The magnetic component is measured by a meter 8 and inductive sensor 9, for instance, from aircraft. When the field magnetic component is present, which is indicative of the presence of a local formation, more detailed measurements are performed to define contours of the formation, and the field electric component E(t) is measured on the studied area. The meter 8 is located on a boat or ship, and the sensor 10, representing the line MN, is towed.

We claim:

1. A method of prospecting for geological formations, comprising the steps of using grounded feeding electrodes including a set of first feeding electrodes and at least one second feeding electrode to inject electric current to a studied medium and excite a signal of electromagnetic field transient in the studied medium;

locating said first feeding electrodes at equal distances in a circle at a site on the studied medium;

locating said at least one second feeding electrode in the centre of said circle;

more precisely defining a number of the first feeding electrodes such that a predetermined signal of a magnetic component transient of a field produced by a country medium does not exceed a predetermined level;

axially symmetrically injecting electric current to the studied medium by periodically coupling the electric current to said optimum number of the first feeding electrodes and to said second feeding electrode;

area measuring a signal of the electromagnetic field transient of a field produced the studied medium, upon each turning the electric current off at said first feeding electrodes and said second feeding electrode;

determining a time of maximum manifestation of a magnetic component transient signal of the field produced by the studied medium;

mapping, based on the results of area measuring the field magnetic component transient signal, isolines corresponding to the time of maximum manifestation of the field magnetic component transient, to define a presence or absence of a geological formation in the studied medium.

2. A method as set forth in claim 1, wherein said step of mapping isolines includes using values of a vertical magnetic component transient signal of the field produced by the studied medium.

3. A method as set forth in claim 1, wherein at said step of more precisely defining a number of said first feeding electrodes, the predetermined level is a level of electromagnetic interference.

4. A method as set forth in claim 1, wherein at said step of more precisely defining a number of said first feeding electrodes, the predetermined level is a level that is higher than the electromagnetic interference level, but less that a half of a maximum value of a magnetic component transient signal of the field produced by the studied medium, and said step of area measuring of a signal of electromagnetic field transient includes subtracting values of a signal of a transient caused by the country medium from the results of measuring a signal of a transient caused by the studied medium.

5. A method as set forth in claim 1, wherein said step of area measuring a signal of electromagnetic field transient includes taking measurements along radial profiles running through grounding points of said first feeding electrodes and through the centre of a distance between any pair of adjacent electrodes of said set of first feeding electrodes.

6. A method as set forth in claim 1, wherein said step of area measuring a signal of electromagnetic field transient includes taking measurements along radial profiles running through grounding points of said first feeding electrodes or through the centre of a distance between any pair of adjacent electrodes of said set of first feeding electrodes.

7. A method as set forth in claim 1, wherein said step of area measuring a signal of electromagnetic field transient includes taking measurement along mutually perpendicular profiles forming a grid.

8. A method as set forth in claim 1, wherein said step of area measuring a signal of electromagnetic field transient includes taking measurements along randomly arranged profiles.

9. A method as set forth in claim 1, further including a step of changing a radius of a circle in which the first feeding electrodes are located, not less than twice from measurement to measurement.

10. A method of prospecting for geological formations on the world ocean shelf, comprising the steps of using a plurality of grounded feeding electrodes, including a set of first feeding electrodes and at least one second feeding electrode to inject electric current to the studied medium and excite a signal of electromagnetic field transient in the studied medium;

locating said first feeding electrodes at equal distances in a circle having a radius R at a site on the studied medium;

locating said at least one second feeding electrode in the centre of said circle;

sounding the studied medium, including axially symmetrically injecting electric current to the studied medium by periodically coupling the electric current to said first feeding electrodes and said second feeding electrode, area measuring a signal of a magnetic component transient of the field produced the studied medium, the measurements being taken upon each turning the electric current off along profiles radiating from the centre of said circle, and area measuring of a signal of an electric component transient upon each turning the electric current off, when the measured values of the signal of a magnetic component transient are present; and mapping, based on the measurement results, isolines to define a position and boundaries of the detected geological formation in the studied medium.

11. A method as set forth in claim 10, wherein the radius R of said circle is at least ¼ of a predetermined depth to be investigated.

12. A method as set forth in claim 10, wherein the step of sounding the studied medium includes measuring magnetic and electric components on the area defined by a circle having a radius 5R, along profiles radiating from said second feeding electrode.

13. A method as set forth in claim 10, wherein said step of sounding the studied medium, such as a site on the sea shelf, further includes setting a maximum operating current applied to each of said first feeding electrodes, by varying a contact surface area of the first feeding electrodes and seawater until the maximum operating current value is reached.

* * * * *

UNITED STATES PATENT AND TRADEMARK OFFICE
CERTIFICATE OF CORRECTION

PATENT NO. : 6,320,386 B1
DATED : November 20, 2001
INVENTOR(S) : Balashov et al.

It is certified that error appears in the above-identified patent and that said Letters Patent is hereby corrected as shown below:

<u>Title page,</u>
Item [73], Assignee, "Tovarischesivo S Ogranichennoi Oivetsivennostiju Nauchotekhnicheskaya Firma "Elta" should be: -- Tovarischestvo s Ogranichennoi Otvetstvennostiju "Nauchno-Tekhnicheskaya Firma "Elta" --.

Signed and Sealed this

Twentieth Day of April, 2004

JON W. DUDAS
*Acting Director of the United States Patent and Trademark Office*